US012700201B2

(12) United States Patent
Martinsen et al.

(10) Patent No.: US 12,700,201 B2
(45) Date of Patent: Aug. 4, 2026

(54) MODIFYING VIRTUAL PROPERTIES OF VIRTUAL OBJECTS

(71) Applicant: Cisco Technology, Inc., San Jose, CA (US)

(72) Inventors: Pål-Erik Martinsen, As (NO); Sigurd Klasson, Oslo (NO); Sebastian André Olsson, Oslo (NO); Lasse Roxrud Farstad, Oesteraas (NO)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 18/081,044

(22) Filed: Dec. 14, 2022

(65) Prior Publication Data

US 2024/0203077 A1     Jun. 20, 2024

(51) Int. Cl.
*G06T 19/20* (2011.01)
*G06F 3/01* (2006.01)
*H04L 12/18* (2006.01)

(52) U.S. Cl.
CPC .............. *G06T 19/20* (2013.01); *G06F 3/011* (2013.01); *G06F 3/017* (2013.01); *G06T 2219/024* (2013.01); *G06T 2219/2016* (2013.01); *H04L 12/1822* (2013.01)

(58) Field of Classification Search
CPC .............. G06T 19/20; G06T 2219/024; G06T 2219/2016; G06F 3/011; G06F 3/017; H04L 12/1822
See application file for complete search history.

(56) References Cited

U.S. PATENT DOCUMENTS

| | | | |
|---|---|---|---|
| 10,339,723 B2 | 7/2019 | Yamamoto et al. | |
| 10,782,844 B2 | 9/2020 | Farouki | |
| 11,460,970 B2 | 10/2022 | Agarawala et al. | |
| 2012/0249416 A1* | 10/2012 | Maciocci ............. | H04N 9/3173 |
| | | | 345/156 |
| 2017/0330150 A1* | 11/2017 | Foley .................... | H04L 65/403 |
| 2019/0278091 A1* | 9/2019 | Smits ..................... | G03B 35/18 |
| 2021/0373741 A1* | 12/2021 | Agarawala .............. | H04L 67/52 |
| 2022/0139056 A1 | 5/2022 | Fieldman | |
| 2022/0179220 A1 | 6/2022 | Hoover et al. | |
| 2023/0057151 A1* | 2/2023 | Wang ..................... | A63F 13/56 |

(Continued)

OTHER PUBLICATIONS

"Spatial—Collaborate from Anywhere in AR", online: https://www.youtube.com/watch?v=PG3tQYIZ6JQ, channel: Spatial, accessed Nov. 30, 2022, 19 pages, YouTube.com.

(Continued)

*Primary Examiner* — Kee M Tung
*Assistant Examiner* — Khoa Vu
(74) *Attorney, Agent, or Firm* — Lee & Hayes, P.C.

(57) ABSTRACT

According to one or more embodiments of the disclosure, a device may generate a virtual collaboration surface to display to one or more collaborators. The device may cause a virtual object to be displayed on the virtual collaboration surface. The device may receive input from one or more collaborators to adjust an orientation of the virtual collaboration surface to an adjusted orientation. The device may modify a virtual property of the virtual object displayed on the virtual collaboration surface to reorient the virtual object according to the adjusted orientation of the virtual collaboration surface.

20 Claims, 9 Drawing Sheets

(56) References Cited

U.S. PATENT DOCUMENTS

2023/0143213 A1*  5/2023  Bar-Zeev .............. G06F 3/0346
                                                 345/419
2024/0103684 A1*  3/2024  Yu ...................... G06F 3/04845

OTHER PUBLICATIONS

Dotson, KYT, "With Drawboard VR users turn any wall or table into an endless canvas", online: https://siliconangle.com/2017/12/04/drawboard-vr-users-turn-wall-table-endless-canvas/, Dec. 2017, accessed Nov. 30, 2022, 2 pages, SiliconANGLE Media Inc.
"55 Inch Mgaic Table / Holo Board", online: https://www.holoboard.ai/store/p4/holo-board-55-inch.html#/, accessed Nov. 30, 2022, 7 pages, PQ Labs.
Barnett, Justin P., "How to Create a Whiteboard in Unity VR—A Step-by-Step Guide", online: https://www.youtube.com/watch?v=sHE5ubsP-E8, accessed Nov. 30, 2022, 10 pages, YouTube.com.
"Introducing 'Horizon Workrooms': Remote Collaboration Reimagined", online: https://www.oculus.com/blog/workrooms/, Aug. 2021, accessed Nov. 30, 2022, 5 pages, Oculus, Facebook Technologies, LLC.

* cited by examiner

VIRTUAL ENVIRONMENT PROCESS 248

VIRTUAL COLLABORATION SURFACE MANAGER 302

VIRTUAL OBJECT MANAGER 304

700

705

START

710

GENERATE A VIRTUAL COLLABORATION SURFACE

715

CAUSE A VIRTUAL OBJECT TO BE DISPLAYED ON THE VIRTUAL COLLABORATION SURFACE

720

RECEIVE INPUT TO ADJUST AN ORIENTATION OF THE VIRTUAL COLLABORATION SURFACE TO AN ADJUSTED ORIENTATION

725

MODIFY A VIRTUAL PROPERTY OF THE VIRTUAL OBJECT DISPLAYED ON THE VIRTUAL COLLABORATION SURFACE

730

END

MODIFYING VIRTUAL PROPERTIES OF VIRTUAL OBJECTS

TECHNICAL FIELD

The present disclosure relates generally to modifying virtual properties of virtual objects.

BACKGROUND

Increasingly, geographic limitations to collaboration are being erased with the proliferation of high-speed network connectivity, communications equipment, and collaboration applications. As a result, geographically dispersed groups of people are frequently engaging in collaboration sessions using web conferencing and other collaboration applications.

While these collaboration applications may include features like live video to help facilitate collaboration, often these collaboration sessions lack the presence and/or engagement of genuine in-person meetings. For instance, collaborators may not experience the intellectual engagement and creative synergies that can come from working with a team in a shared space and collaboratively interacting with the same set of objects/documents/notes/etc.

In some instances, conducting collaboration sessions using extended reality (XR) (e.g., augmented reality (AR), virtual reality (VR), mixed reality (MR) etc.) may help to bridge this gap. However, current XR applications provide virtual content that has little to no connection to the real physical world. When an XR experience feels disconnected from the real physical world to a collaborator it may not only fail to improve collaboration sessions, but it may actually become a distraction that is further detrimental to the collaborative experience.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
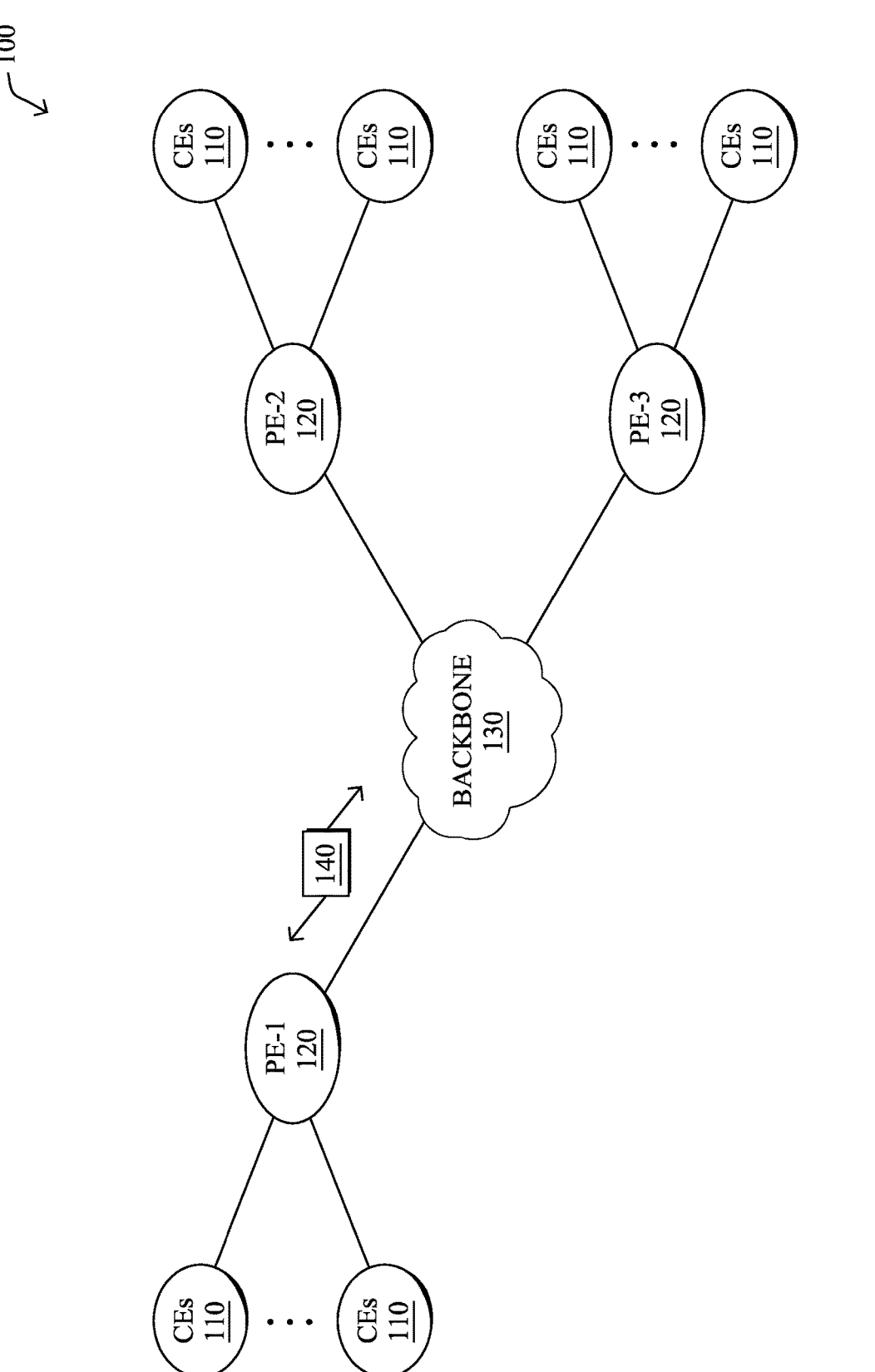
FIGS. 1A-1B illustrate an example communication network.

According to one or more embodiments of the disclosure a device may generate a virtual collaboration surface to display to one or more collaborators. The device may cause a virtual object to be displayed on the virtual collaboration surface. The device may receive input from one or more collaborators to adjust an orientation of the virtual collaboration surface to an adjusted orientation. The device may modify a virtual property of the virtual object displayed on the virtual collaboration surface to reorient the virtual object according to the adjusted orientation of the virtual collaboration surface.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
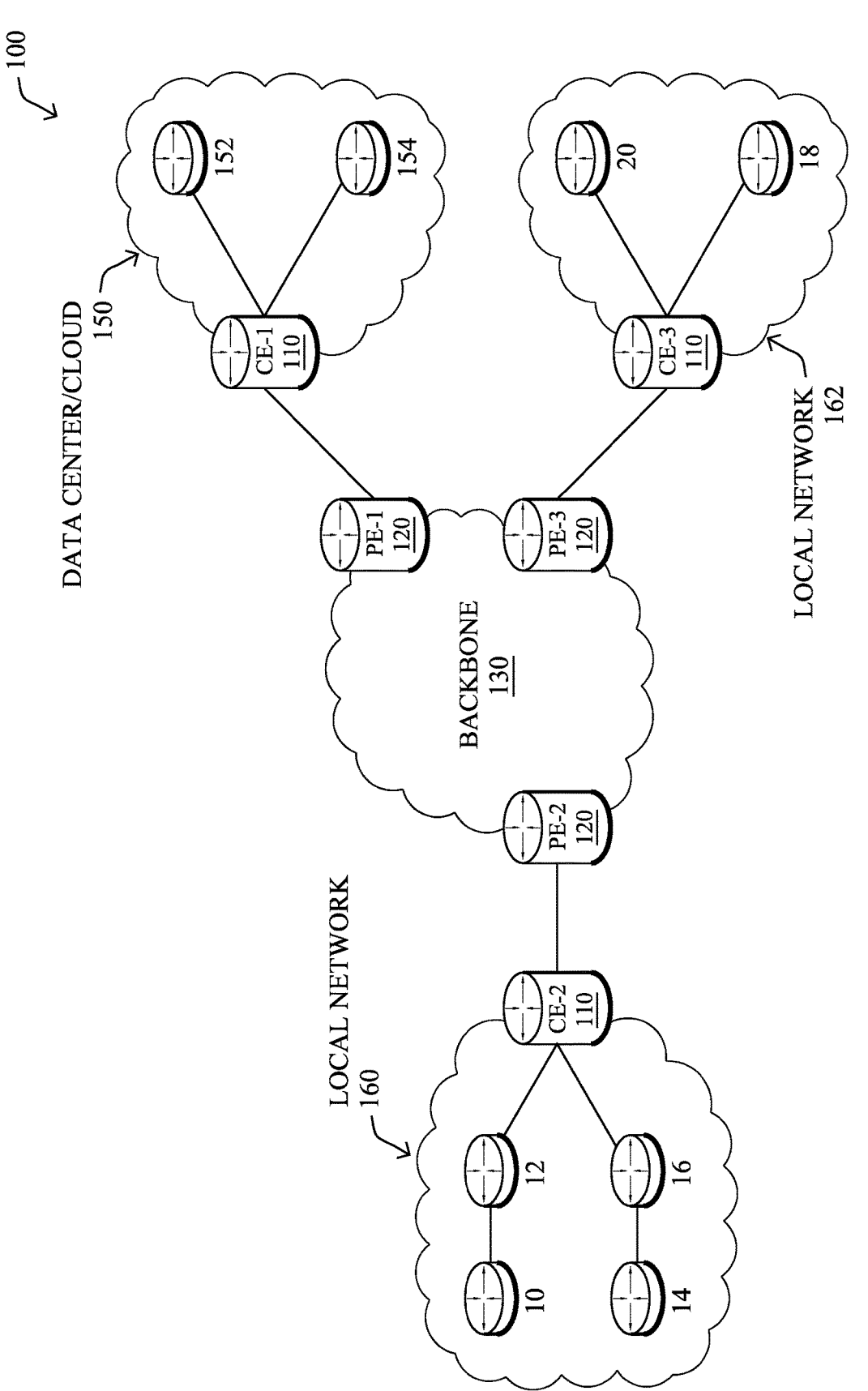

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
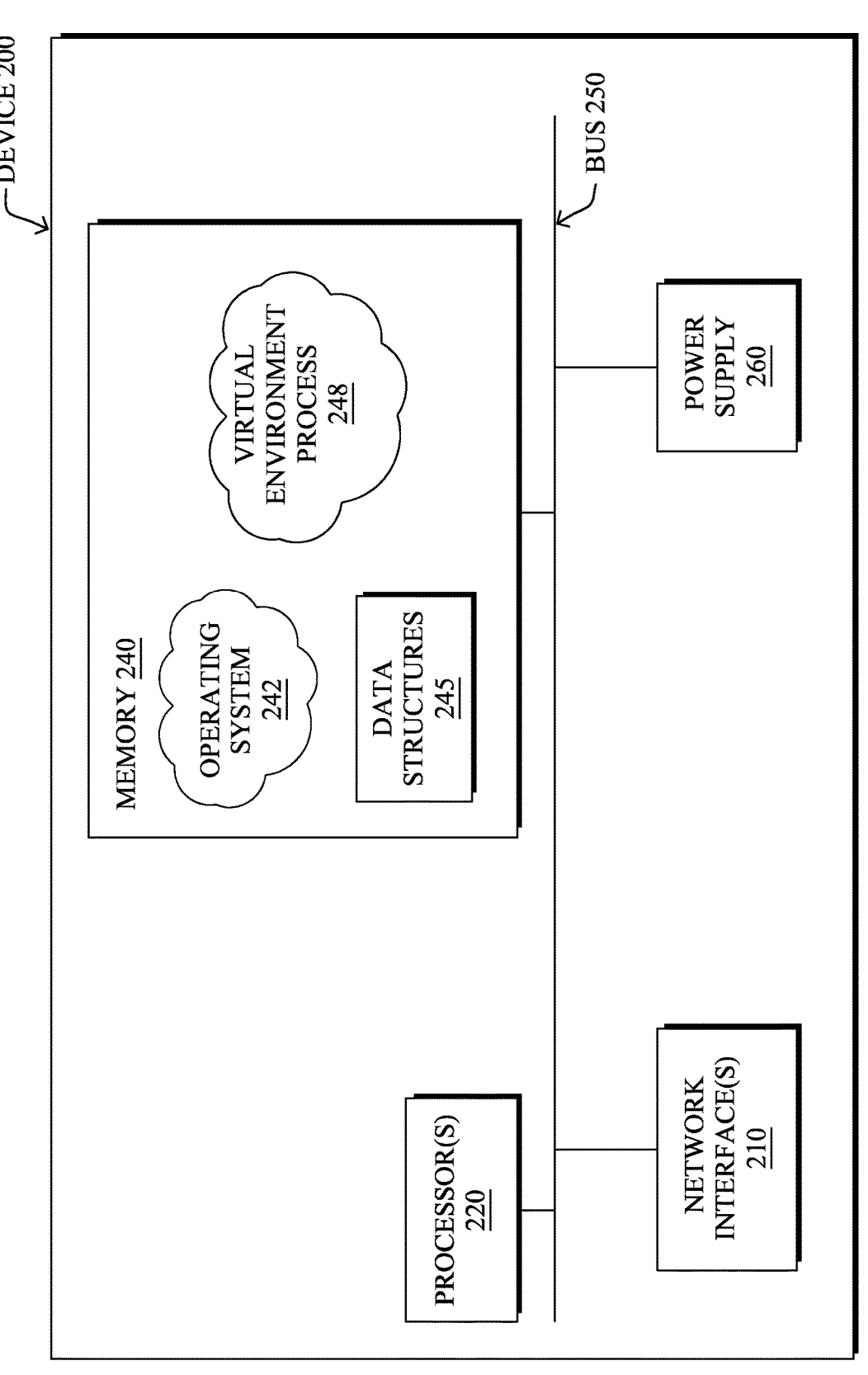
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise virtual environment process 248, as described herein, any of which may alternatively be located within individual network interfaces.

As noted above, when an XR experience feels disconnected from the real physical world to a collaborator it may not only fail to improve collaboration sessions, but it may actually become a distraction that is further detrimental to the collaborative experience. For example, whiteboarding can be an excellent collaboration technique in the real physical world. With whiteboarding, collaborators can conduct brainstorming sessions on a whiteboard where one or more of the collaborators can view, draw on, place sticky notes on, etc. the whiteboard allowing multiple team members to view, comment on, edit, share, etc. a common set of information. However, the disconnect between the virtual world and real physical world features prominently in existing virtual whiteboarding techniques.

For example, viewing a shared screen view on a monitor, portable computing device, etc. frequently fails to engage collaborators. There are a variety of reasons for this failure, but generally it may be a result of such techniques being non-immersive and failing to provide an accurate enough simulation of real physical world collaboration sessions. This failure may translate to a failure to immerse a collaborator in what feels like a person-to-person experience and in a manner that adapts to the confines of their real physical world environment.

While current applications of XR to collaboration sessions seek to provide a more immersive experience by extending the reality of a collaborator to include the collaboration session, they often fail to reach this mark as they largely amount to nothing more than sharing the contents of a presenter's screen on a head mounted display on a collaborator. These virtual collaboration experiences may fail to immerse a collaborator as they do not adapt to the collaborator, the collaborators real physical world environment, the physics of the collaborators real physical world environment, etc. in a way that causes the collaborator to not only feel like they are engaged in a person-to-person collaboration experience, but also that they can confidently, comfortably, and naturally engage in the session as though it is an extension of their real physical world environment. For instance, existing virtual collaboration sessions are not responsive or personalized to collaborators and their real physical world environment. As a result, collaboration surfaces and objects do not intuitively operate, behave, and/or display the same properties as their real physical world counterparts.

———Modifying Virtual Properties of Virtual Objects———

The techniques herein introduce mechanisms for conducting XR collaboration sessions that facilitate personalizing of the shared collaboration experience to a collaborator's preferences, perspective, and/or real physical environment. The techniques may involve a mechanism for providing virtual collaboration components (e.g., virtual collaboration surface, virtual collaboration objects, etc.) that conform to the real physical environment of the collaborators and exhibit virtual properties that mimic physical properties of their real physical world counterparts. In some examples, this may include a virtual collaboration surface that behaves as a virtual tablecloth.

In addition, the techniques herein may introduce mechanisms for collaborators to adjust their collaboration experience (e.g., a virtual collaboration surface that is adjustable among orientations such as a tabletop style collaboration space and a whiteboarding collaboration space) according to their preferences and/or the limitations of their real physical world environment without compromising the immersive real world feel of the experience. For example, the techniques may include the modification of virtual properties of virtual objects displayed on the virtual collaboration space when the orientation of the virtual collaboration surface is adjusted to mimic a physical property that would cause a physical instantiation of the virtual object to remain on a physical instantiation of the virtual collaboration surface when in the adjusted orientation.

Illustratively, the techniques described herein may be performed by hardware, software, and/or firmware, such as in accordance virtual environment process 248, which may include computer executable instructions executed by the processor 220 (or independent processor of interfaces 210) to perform functions relating to the techniques described herein.

Specifically, according to various embodiments, a device may generate a virtual collaboration surface to display to one or more collaborators. The device may cause a virtual object to be displayed on the virtual collaboration surface. The device may receive input from one or more collaborators to adjust an orientation of the virtual collaboration surface to an adjusted orientation. The device may modify a virtual property of the virtual object displayed on the virtual collaboration surface to reorient the virtual object according to the adjusted orientation of the virtual collaboration surface.

Figure 3:
FIG. 3 illustrates an example architecture for modifying virtual properties of virtual objects.
Figure 3:
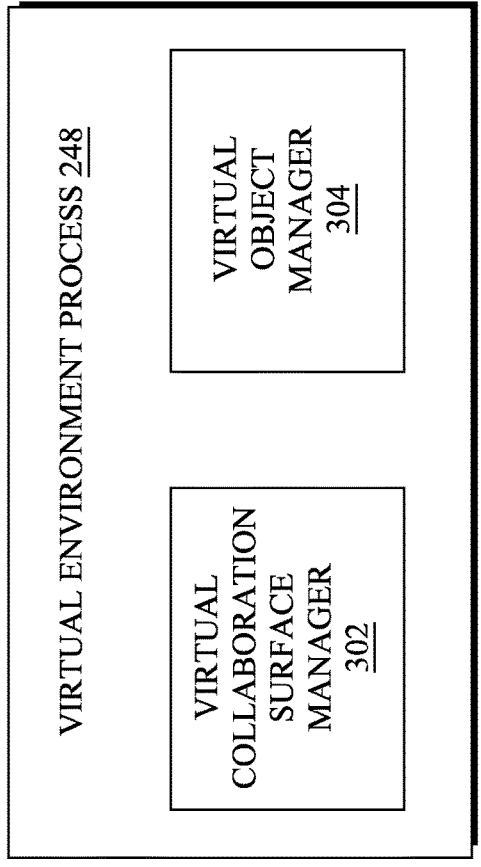

Operationally, FIG. 3 illustrates an example of an architecture 300 for modifying virtual properties of virtual objects according to various embodiments. At the core of the architecture 300 is virtual environmental process 248, which may be executed by a device that provides a virtual collaboration service in a network, or another device in communication therewith. In some instances, a portion of virtual environmental process 248 may be executed by a wearable XR display, a projection device, a hologram generating device, an interactive display, and/or a computing device communicatively coupled therewith. In general, the virtual environmental process 248 may be executed to provide an XR virtual collaboration session and, therefore, may be executed on any device associated with the delivery of the XR virtual collaboration session.

As shown, virtual environmental process 248 may include a virtual collaboration surface manager 302 and a virtual object manager 304. As would be appreciated, the functionalities of these components may be combined or omitted, as desired. In addition, these components may be implemented on a singular device or in a distributed manner, in which case the combination of executing device can be viewed as their own singular device for purposes of executing virtual environmental process 248.

During execution, virtual collaboration surface manager 302 may manage the generation of a virtual collaboration surface to display to one or more collaborators of a collaboration session. Generating a virtual collaboration surface may include rendering the virtual collaboration surface and/or causing the virtual collaboration surface to appear to a collaborator. For instance, the virtual collaboration surface may be generated to be displayed to a collaborator via a respective wearable display, a projection device, a hologram generating device, an interactive display, etc.

A virtual collaboration surface may include a virtual surface or virtually visible zone to host the contents of a collaboration session. The virtual collaboration surface may include a displayable virtual instantiation of a collaboration zone that mimics a physical surface and is not a particular window viewed on a monitor nor a particular display space. Rather, the virtual collaboration surface is an XR virtual surface that appears to a collaborator as though it is a real surface where a collaboration session is hosted.

In some instances, the virtual collaboration surface may appear as though it is an object such as a virtual tablecloth or virtual whiteboard to a collaborator. For instance, the virtual collaboration surface may be visualized by collaborators as a virtual instantiation integrated into their real physical environment (e.g., by XR image delivery equipment) rather than as an image on a computer monitor.

The virtual collaboration surface may act as shared virtual collaboration zone where geographically distributed collaborators remotely attending the collaboration session can commonly share, interact with, and view a common set of virtual notes, virtual schematics, videos, images, virtual objects, etc. For example, the virtual collaboration surface may serve as a virtual whiteboarding surface. For instance, the virtual collaboration surface may be configured to behave like paper or other markable surface where collaborators can virtually draw and/or erase as though the virtual collaboration surface is a shared physical whiteboard.

The virtual surface manager 302 may manage an appearance of the virtual collaboration surface to each of the collaborators. This may mean adjusting the appearance of the virtual collaboration surface on a collaborator-by-collaborator basis, collaborator team-by-collaborator-team basis, collaboration site-by-collaboration site basis, etc.

Managing the appearance of the virtual collaboration surface may include automatically adjusting the appearance of the virtual collaboration surface. In some examples, each of the collaborators in a collaboration session may receive a personalized view of the virtual collaboration surface. For instance, while each of the collaborators of a collaboration session are viewing and interacting with a same virtual collaboration surface, each of the collaborators may have a personalized view of that same virtual collaboration surface that varies from the view of the other collaborators and/or a presenting collaborator.

For instance, the appearance of the virtual collaboration surface may be personalized to appear in a first orientation (e.g., tabletop orientation) to a first collaborator and to appear in a second orientation (e.g., non-horizontal whiteboard orientation) to a second collaborator. In additional examples, the content (e.g., text, drawings, notes, images, etc.) displayed on the virtual collaboration surface may be personalized to appear in a first orientation (e.g., oriented toward a first collaborator) to the first collaboration and in a second orientation (e.g., oriented toward a second collaborator) to the second collaborator. That is, content displayed on the virtual collaboration surface, while being the same content across collaborators, may be rotated in a most readable direction for each of the collaborators.

This may be the case even when the collaborators are sharing the same collaboration space. For example, a portion of collaborators in a collaboration session may share the same real physical environment (e.g., an XR conference room). Each collaborator of that portion of collaborators may be viewing the same virtual collaboration surface through their respective wearable displays (e.g., as a tabletop surface, as a non-horizontal whiteboard surface, etc.). However, each collaborator in the same real physical environment may have a different physical orientation relative to the position in the real physical environment where the virtual collaboration surface is being displayed. For instance, where the virtual collaboration surface is oriented as a tabletop collaboration surface two collaborators may be on opposing sides of the tabletop surface or where the virtual collaboration surface is a vertically oriented whiteboard collaboration surface two collaborators may be at opposing viewing angles, differing filed of view (FOV), differing depth of view, differing angle of view, and/or on opposite sides of the virtual collaboration surface.

In these instances, when viewed from the perspective of a first collaborator the content on the collaboration surface may be easily seen and/or read, while from the perspective of a second collaborator the content on the collaboration surface in that same orientation may be difficult or impossible to see and/or read for the second collaborator. Therefore, virtual surface manager 302 may, for each collaborator, reorient the virtual collaboration surface and/or the content displayed on the virtual collaboration surface so that the content is displayed in a most readable and/or viewable orientation for that collaborator. For example, text orientation may be changed for each collaborator so that it is right-side-up and not inverted when viewed by each collaborator. In some examples, text or other content may be tilted up and/or angled toward a collaborator. Again, the result may be that each collaborator is viewing the same virtual collaboration surface and/or content thereupon, but their individual view may have a personalized orientation of the same virtual collaboration surface and/or content that is tailored to their preferences and/or orients the virtual collaboration surface and/or its contents to the relative physical position of the collaborator in the real physical environment where the virtual collaboration surface is displayed.

Managing the appearance of the virtual collaboration surface may additionally include altering the appearance or functionality of the virtual collaboration surface and/or its contents. Again, these alterations may be done on a collaborator-by-collaborator basis, collaborator team-by-collaborator-team basis, collaboration site-by-collaboration site basis, etc. Further, the alterations may be personalized to collaborator preferences, relative positions, posture, environments, abilities, etc.

For example, as described above the virtual collaboration surface may appear as a virtual zone or object where collaboration occurs and may have the appearance of a tablecloth or whiteboard. As such, the virtual collaboration surface may appear to have properties such as a shape, a relative position, color, a brightness, a contrast, etc. to a collaborator.

Each of the properties of the virtual collaboration surface may be adjusted by virtual surface manager 302. For example, the brightness or contrast of the virtual collaboration surface may be adjusted in order to make it better visible and/or more visually pleasing to a collaborator. In addition, the color of the virtual collaboration surface may be adjusted to provide better visibility of and/or contrast with contents being displayed thereupon. In some examples, the color, size, brightness, etc. of the contents displayed on the virtual collaboration surface may be adjusted in order to provide better visibility.

In some instances, these types of adjustments may be made automatically based on the abilities of the collaborator. For instance, if a user profile, machine observations, and/or menu selections indicate that a particular collaborator is visually impaired, then the contents of the virtual collaboration surface may be enlarged and/or colorized for maximum contrast against the virtual collaboration surface. In some instances, visually impaired users may be provided with an option to have text from the virtual collaboration surface read aloud to them by their device. Likewise, if a user profile, machine observations, and/or menu selections indicate that a particular collaborator prefers or understands a language different than the language of the native text to be displayed on the virtual collaboration surface, then the text may undergo a machine translation and be displayed in the different language to the collaborator.

Managing the appearance of the virtual collaboration surface may include managing and adjusting additional properties of the virtual collaboration surface. For instance, the way in which the virtual collaboration surface behaves, the virtual physics that apply to the virtual collaboration surface, how the virtual collaboration surface behaves when positioned/repositioned, the collaborator gesture inputs to which the virtual collaboration surface responds, how the virtual collaboration surface responds to collaborator gesture inputs, how adjustments and/or inputs to the virtual collaboration surface by a collaborator are translated to personalized adjustments for each of the other collaborators, etc.

For example, virtual surface manager 302 may cause the virtual collaboration surface to behave as though it is a virtual tablecloth and/or virtual whiteboard. This may include having the virtual collaboration surface snap and/or conform to a real physical world surface (e.g., a physical wall, a physical table, a physical object, etc. in the environment of each collaborator. For example, a virtual collaboration surface may be rendered by virtual surface manager 302 as a virtual tablecloth that appears to a collaborator as though it is draped over and/or resting on a real physical world table in the real physical world environment of the collaborator. Alternatively, the virtual collaboration surface may be rendered by virtual surface manager 302 as a virtual whiteboard that appears to a collaborator as though it is mounted on and/or conforms to the surface of a real physical world wall in the real physical world environment of the collaborator. Further, the virtual collaboration surface may be snapped and/or conformed to a virtual surface (e.g., a virtual wall, a virtual table, a virtual object, etc.).

In various embodiments, the virtual collaboration surface may also be rendered without being snapped to a real physical world surface or a virtual surface. In such examples, the virtual collaboration surface may be rendered to appear as a virtual wall, tabletop, etc. essentially floating in the real physical world environment of the collaborator, as well. Since each of the collaborators may be in a different real physical world environment (e.g., remote rooms, remote offices, remote locations, etc.) or in different portions of a same different real physical world environment, the size, orientation, snapped to surface, etc. displayed to each of the collaborators may be personalized to their relative perspective and/or real physical world environment.

For instance, a virtual collaboration surface may be snapped to a large wall in a conference room for a first collaborator/team of collaborators in a collaboration session who are located in the conference room. The same virtual collaboration surface may be snapped to snapped to a small desk in an office of a second collaborator in the collaboration session who is located in cubical office. Further, the same virtual collaboration surface may be snapped to a small, curved wall in a home office of a third collaborator in the collaboration session who is located in a home office. It can be appreciated that this level of personalization may allow different collaborators and/or teams of collaborators to configure their collaboration session such that they can view and/or interact with the virtual collaboration surface and/or its contents in a way that is most favorable for their real physical world environment and/or their arrangement within their real physical world environment.

In addition, this level of personalization may be used facilitate the best virtual collaboration surface for each collaborator's role in a collaboration session. For instance, if a collaborator's present role in a collaboration session is that of a presenter or content contributor, then that collaborator may be provided a virtual collaboration surface that is easily manipulatable, easily controllable, oriented to easily accept input such as writing, etc. For instance, the presenting collaborator may be displayed a virtual collaboration surface rendered on a desk surface immediately in front of the collaborator. Conversely, if the collaborator's role in the collaboration session is that of a spectator, then that collaborator may be provided a virtual collaboration surface that is easily and comfortably visible to that spectator. For instance, the spectating collaborator may be displayed a virtual collaboration surface rendered on a wall in front of the collaborator. As these roles evolve in the collaboration sessions, the appearance of the collaboration surface may be adapted accordingly (e.g., switching the virtual collaboration surface from being snapped to a wall to being snapped to a desk in front of a collaborator when they begin adding content to the virtual collaboration surface).

Managing the appearance of the virtual collaboration surface may also include causing the virtual collaboration surface mimic aspects of the behavior of a real physical world object such as a tablecloth and/or a whiteboard. For example, this may include appearing as a tablecloth resting on a horizontal surface or as a whiteboard oriented non-horizontally when those orientations are applicable.

In addition, managing the appearance of the virtual collaboration surface may include causing the virtual collaboration surface to appear to respond naturally input from a collaborator as it occurs. In some instances, this may include accepting user contributions to the collaboration session. For example, when a collaborator performs a gesture, such as drawing on the surface with their finger, a virtual writing instrument, a physical stylus, etc., a corresponding virtual mark may be added to the virtual collaboration surface. The same mark, although capable of personalization as outlined above, may also be visible to the other collaborators on their view of the virtual collaboration surface.

Further, virtual collaboration surface manager 302 may manage the manipulation of the virtual collaboration surface such that the virtual collaboration surface responds naturally to and/or has the appearance of responding naturally to manipulation by a collaborator as it occurs. This may include responding as a tablecloth resting on a horizontal surface or as a whiteboard oriented non-horizontally when those orientations are applicable.

In various embodiments, the collaboration surface manager 302 may manage how the virtual collaboration surface behaves in response to receiving input from one or more collaborators to adjust an orientation of the virtual collaboration surface to an adjusted orientation. For example, when a collaborator performs a gesture, such as pinching at the tablecloth, the collaborator may be given control of the orientation of the virtual collaboration surface so that they may reposition, reorient, etc. the virtual collaboration surface while virtually holding it. This may include moving the virtual collaboration surface to a new location and then releasing it (e.g., by discontinuing the gesture), thereby causing the virtual collaboration surface to be virtually repositioned into a new position (e.g., snap to a new physical or virtual vertical surface, snap in a new orientation to the same physical or virtual vertical surface, be displayed suspended as a floating horizontal surface in a new location, etc.). Alternatively, the collaborator may use the gesture to pick up the virtual collaboration surface from a horizontal orientation and reorient it to a non-horizontal orientation (e.g., snap to a physical or virtual non-horizontal surface, be displayed suspended as a floating non-horizontal surface in a new location, etc.) and vice versa.

During execution, virtual object manager 304 may manage virtual objects displayed on the virtual collaboration surface. Virtual objects may include virtual representations or instantiations of objects that are rendered as being separate from the virtual collaboration surface but being situated on the virtual collaboration surface. The virtual objects may be snapped to and/or displayed within the confines of the virtual collaboration surface but have the appearance of an object that is separate from the virtual collaboration surface object. For instance, the virtual collaboration surface may be conceptualized and/or appear as the collaboration stage, but the virtual object may be conceptualized and/or as separate objects that can be viewed, manipulated, moved around, and interacted with on that stage. The virtual objects may be based on files, image captures, etc. that exist outside of the virtual collaboration surface but are displayed on the virtual collaboration surface during a collaboration session. In some examples, the virtual objects may be dragged and dropped on to the virtual collaboration surface from other storage locations, applications, etc.

Virtual objects may include virtualized objects such as virtual notepads, virtual pictures, virtual schematics, virtual documents, virtual three-dimensional or two-dimension objects, three-dimensional point clouds, virtual models, etc. The virtual objects are not permanently anchored parts of the virtual collaboration surface, but rather are virtual objects that can be manipulated independently from the virtual collaboration surface, and which may have their own unique/independent properties and/or be subject to manipulation, gesture control, repositioning, adjustment, etc. that is unique/independent from that of the virtual collaboration surface.

In some instance, the virtual objects may be independently added to the virtual collaboration surface by collaborators during the collaboration session. For instance, a group of engineers may be participating in a collaboration session to brainstorm design options for a new product. One of the engineers may introduce a three-dimensional point cloud of the current product design to the virtual collaboration surface such that the three-dimensional point cloud appears to all the collaborators as a virtual object displayed on the virtual collaboration surface.

Virtual object manager 304 may manage a virtual object by managing a virtual property of the virtual object. The virtual property may include a property influencing the appearance of the virtual object. Therefore, managing the virtual property may include configuring the appearance of the virtual object in the same manner as previously described with respect to the virtual collaboration surface. For instance, managing the appearance of the virtual object may include configuring a color, contrast, brightness, size, language, orientation of the virtual object relative to a collaborator and/or relative to an orientation of the virtual collaboration surface, etc. These properties may influence how the virtual object appears on the virtual collaboration surface.

In addition, managing a virtual property may include configuring a virtual property that influences the how the virtual object interacts with the virtual collaboration surface. For example, managing a virtual property may include configuring a virtual attachment between the virtual object and the virtual collaboration surface.

In various embodiments, when a virtual collaboration surface is in a horizontal and/or near-horizontal orientation then a virtual object may be rendered as an object sitting on yet unattached to the surface of the virtual collaboration surface. For instance, the properties of the virtual object may be configured such that the virtual object is able to be pushed around and/or slid along the virtual collaboration surface as though it is an object sitting on a tabletop.

Conversely, when the virtual collaboration surface is in a non-horizontal, vertical, and/or near-vertical orientation, then the virtual objects may be rendered as objects removably stuck (e.g., by a virtual adhesive-like force, by a virtual tape-like mechanism, by a virtual hook and loop-like mechanism, etc.) to the surface of the virtual collaboration surface. For instance, the properties of the virtual object may be configured such that the virtual object is sticky and is not able to be pushed around and/or slid along the virtual collaboration surface as though it is an object sitting on a tabletop, but rather can be picked off the surface and stuck to another portion of the surface.

As previously mentioned, the virtual collaboration surface may be reoriented based on input received from one or more collaborators to adjust an orientation of the virtual collaboration surface to an adjusted orientation. Virtual object manager 304 may modify the virtual properties of a virtual object responsive to such reorientation.

For instance, virtual object manager 304 may modify a virtual property related to the appearance of the virtual object on the virtual collaboration surface in order to reorient the appearance of the virtual object to the adjusted orientation of the virtual collaboration surface. For instance, the orientation of the virtual object may be changed such that it appears right-side-up and/or appears in a similar perspective to the collaborators in the adjusted orientation as it did in the original orientation despite the orientation of the virtual collaboration surface having changed. For example, if the top of the virtual object is oriented facing the ceiling with its bottom facing the virtual collaboration surface in a horizontal orientation, then its appearance may be changed so that the top of the virtual object is oriented facing the ceiling with its side surface facing the virtual collaboration surface in a vertical orientation In some instances, a virtual property that influences the how the virtual object interacts with the virtual collaboration surface may be modified. Modifying this type of virtual property may modify the behavior of the virtual object with respect to how it interacts with the virtual collaboration surface so that it can more closely mimic a natural real physical world interaction. For instance, modifying a virtual property of a virtual object may change the virtual object's behavior and appearance from an object removably stuck to a vertical surface to an object freely sitting on a horizontal tablecloth surface. In some examples, modifications to the virtual properties of a virtual object may correspond to modifications to an orientation of the virtual collaboration surface that the object is displayed on. For example, the virtual properties of a virtual object may be modified in a manner that corresponds to the virtual collaboration surface being reoriented from a vertical orientation to a horizontal orientation and vice versa.

The adjustments may be made on an all-collaborator basis, a collaborator-by-collaborator basis, a collaborator team-by-collaborator team basis, a collaborator role-by-collaborator role basis, a collaboration site-by-collaboration site basis, etc. The adjustments may be performed to the virtual object independent of any adjustment to the virtual collaboration surface upon which a virtual object is displayed.

In this manner, the virtual object may be repositionable in a way that feels natural and real to a collaborator and in a manner that corresponds to what would look and feel natural to collaborator. Further, the automatic adjustments to virtual objects not only conveniently keep the content of the collaboration surface oriented optimally with respect to the collaborator, but the modifications to their virtual properties also provide a feeling that the virtual objects are real and are adapting their virtual behavior to mimic real world properties involved in achieving adjusted orientations. As such, virtual objects and their interactions with the virtual collaboration surface feel natural and real to collaborators.

Figure 4A:
FIGS. 4A-4B illustrate examples of deployments for modifying virtual properties of virtual objects.
Figure 4A:
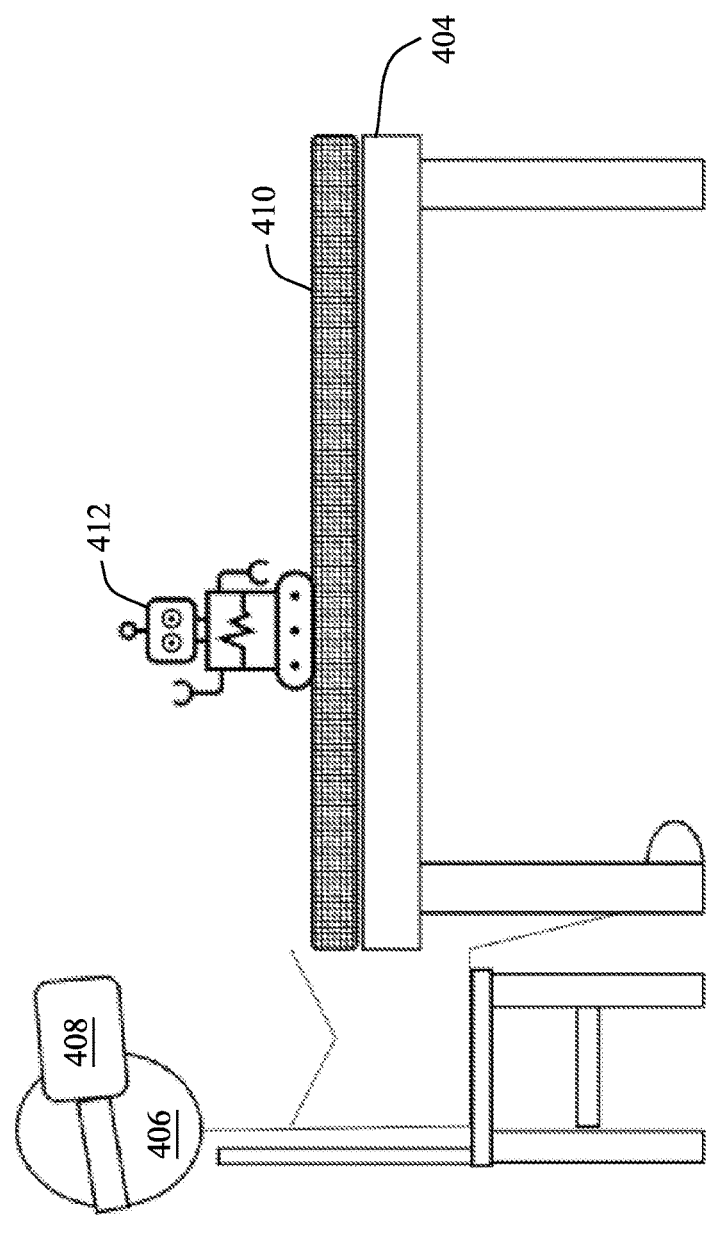
Figure 4B:
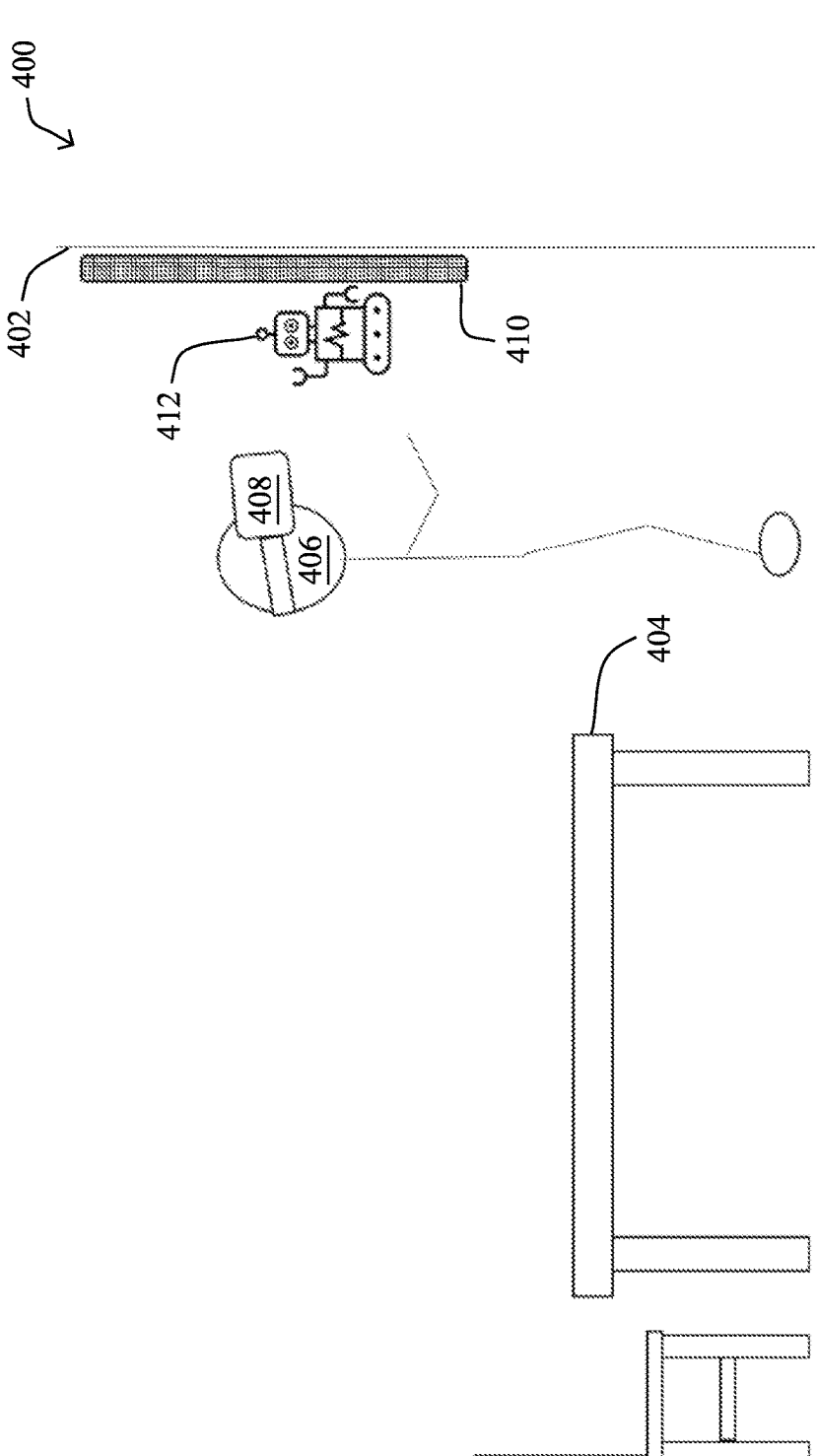

FIG. 4A and FIG. 4B illustrate examples of deployments 400 for modifying virtual properties of virtual objects within a real physical world environment according to various embodiments. Deployments 400 may be deployments of a virtual collaboration surface 410, a virtual object 412, an/or an architecture (e.g., architecture 300) for modifying virtual properties of virtual objects. Deployments 400 may occur in a real physical world environment that includes real physical world objects such as a wall 402, a table 404, etc. The environment may be used by a collaborator 406 to engage in a virtual collaboration session using an XR device 408, such as a head mounted XR display.

In the deployment 400 illustrated in FIG. 4A, a virtual collaboration surface 410 is generated and displayed, via device 408, as snapped to the table 404. In such examples, the virtual collaboration surface 410 may be categorized as being displayed in a horizontal tablecloth orientation resting atop and/or conforming to the surface of table 404. The virtual collaboration surface 410 and/or its contents may be viewed by other collaborators, although not necessarily in the same orientation.

A virtual object 412 may be displayed on the virtual collaboration surface 410. The virtual object 412 may be a three-dimensional representation of a schematic of a physical object that is the subject of the collaboration. Since the virtual collaboration surface 410 in FIG. 4A is in the horizontal tablecloth orientation, the virtual object 412 may be rendered as an object sitting atop the virtual collaboration surface 410. The properties of the virtual object 412 may be configured accordingly. For example, the virtual object 412 may be configured to be freely slidable along the virtual collaboration surface 410 and be oriented such that the top of the model faces up and the bottom of the model faces the virtual collaboration surface.

Input from collaborator 406 may be received during the collaboration session. The input may include input to cause an adjustment to an orientation of the virtual collaboration surface to an adjusted orientation. For example, collaborator 406 may perform a gesture such as pinching the surface of the virtual collaboration surface 410, carrying the virtual collaboration surface 410 across the room, and releasing the virtual collaboration surface 410 by releasing the pinch when the virtual collaboration surface is against the wall 402 (e.g., the adjustment of virtual collaboration surface 410 occurring from FIG. 4A to FIG. 4B).

As a result, the virtual collaboration surface 410 may be reoriented to the orientation depicted in the deployment 400 of FIG. 4B. In the deployment 400 illustrated in FIG. 4B, the virtual collaboration surface 410 is generated and displayed, via device 408, as snapped to the wall 402. In such examples, the virtual collaboration surface 410 may be categorized as being in a non-horizontal whiteboard orientation mounted to and/or conforming to the surface of wall 402. The virtual collaboration surface 410 and/or its contents may still be viewed by other collaborators, although not necessarily in the same orientation.

Since, in FIG. 4B, the virtual collaboration surface 410 is in the non-horizontal whiteboard orientation, the virtual object 412 may be rendered as an object reversibly stuck to the virtual collaboration surface 410. The properties of the virtual object 412 may be accordingly configured. This means that the virtual properties of the virtual object 412 may be modified from what they were in the horizontal tablecloth orientation. For example, the virtual properties of virtual object 412 may be modified so that virtual object 412 is no longer able to be freely slid along the virtual collaboration surface 410 and instead is reconfigured to behave in a peel-and-stick manner with respect to the virtual collaboration surface 410. This may also include modification of the virtual properties of the virtual object 412 such as automatically reorienting the virtual object 412 such that that the top of the model faces up and the side of the model faces the virtual collaboration surface 410.

It should also be appreciated that FIG. 4A and FIG. 4B can illustrate simultaneous deployments 400 in two separate environments with two different collaborators. For instance, FIG. 4A can illustrate a first collaborator of a collaboration session seated at a table 404 in a conference room viewing a virtual collaboration surface 410 and an object 412. Meanwhile, FIG. 4B can illustrate a second collaborator of the same collaboration session viewing the same virtual collaboration surface 410 and same object 412 in a second location. Each of the collaborators simultaneously have different views in different orientations of the same virtual collaboration surface 410 and same object 412 based on their preferences, their role, their site, their team, their perspective, etc.

Figure 5:
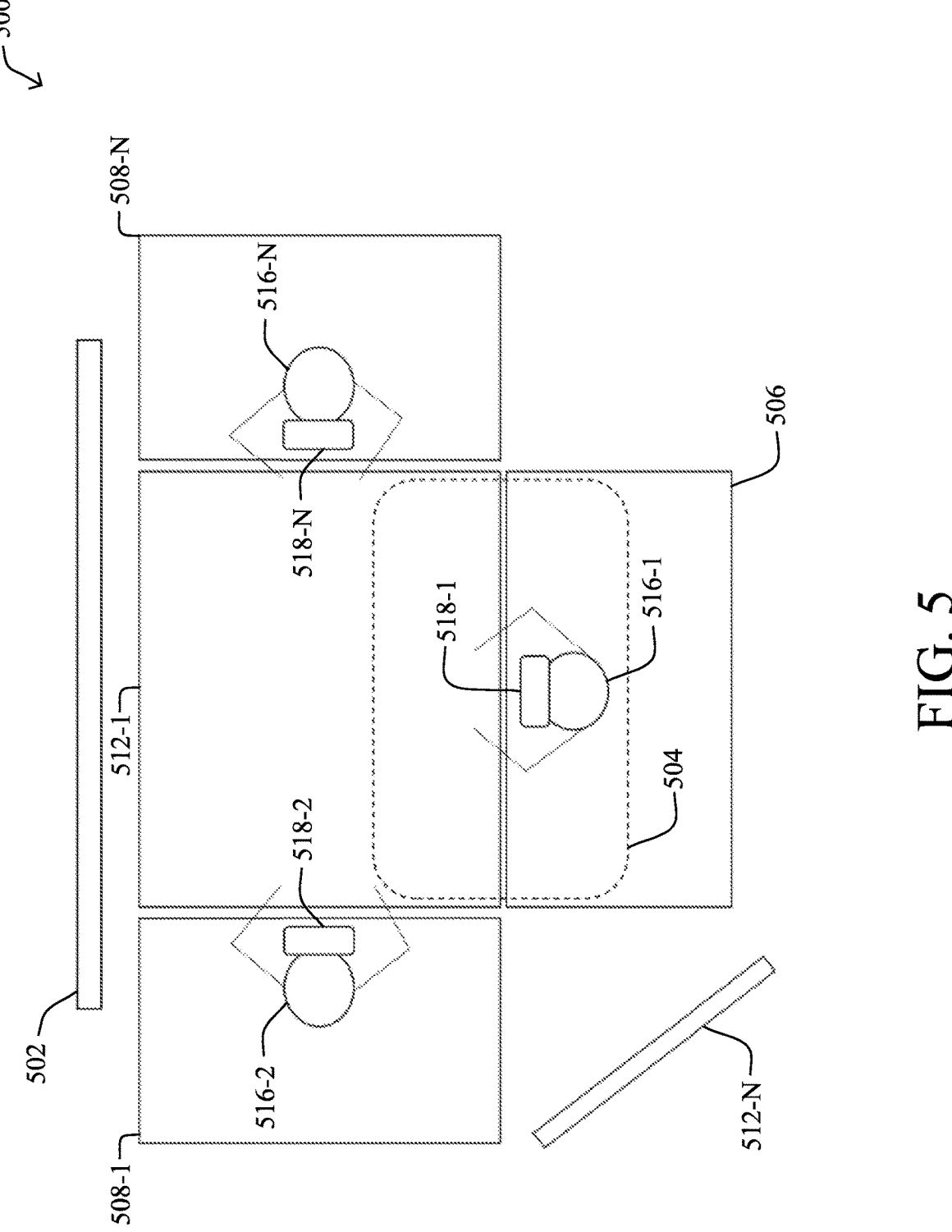
FIG. 5 illustrates an example architecture for modifying virtual properties of virtual objects.

FIG. 5 illustrates an example of a deployment 500 for modifying virtual properties of virtual objects within a real physical world environment according to various embodiments. Deployment 500 illustrates one perspective of a collaboration session. This perspective may be that of a particular site participating in a collaboration session. This site may include one or more collaborators 516 (e.g., a team of collaborators 516-1 . . . 516-N) participating in an XR virtual collaboration session using an XR device 518 (e.g., XR devices 518-1 . . . 518-N). This site may be the site where a presenter (e.g., collaborator 516-1) who is leading and/or presenting in the collaboration session is located. There may be other sites (e.g., remote sites) with other collaborators (e.g., remote collaborators) additionally participating in the same collaboration session remotely.

The deployment 500 may include a hologram capture device 502. The hologram capture device 502 may capture/ and/or project images of live people, such as collaborators 516, and/or real physical world objects as holograms.

The deployment 500 may include a physical object capture zone 504. The physical object capture zone 504 may be a zone in the real physical world environment where physical objects and/or a live person need to be positioned to be captured by hologram capture device 502. The physical object capture zone 504 may be defined and/or located within the environment based on depth, angle, FOV, etc. limitations of a hologram capture device 502.

The content captured in the physical object capture zone 504 may be reproduced virtually at a remote site to other collaborators. For instance, the content may be reproduced as a hologram located on a remote virtual collaboration surface next to a remote hologram projection device or simply displayed in the virtual collaboration zone via a collaborator's XR device. The virtual properties of the virtual collaboration surface at the remote site may be adjusted to provide an optimal backdrop for the hologram. The collaborators at the remote site may freely reposition the captured hologram anywhere within the virtual collaboration surface according to their preferences.

The virtual properties of the hologram may be configured to facilitate this repositioning in a manner that mimics the expected natural behavior of an object in the real physical world. For instance, when the virtual collaboration surface is in a horizontal orientation, then the hologram may be slid along the virtual collaboration surface. However, if the virtual collaboration surface is oriented vertically, then the hologram may behave as though it is removably adhered to the surface of the virtual collaboration surface and may be repositioned by grabbing (e.g., a grasping gesture, a pinching gesture, etc.) the hologram and separating it from the surface of the virtual collaboration surface and then re-adhering it to the virtual collaboration surface by positioning against the virtual collaboration surface and releasing the grab.

An active presenter (e.g., collaborator 516-1) may be positioned in a local presenter zone 506. A portion of the local presenter zone 506 may overlap with the physical object capture zone 504. While presenting, a presenter may share real life objects within the physical object capture zone 504 within the local presenter zone 506. These objects and/or the presenter may then be captured and/or reproduced virtually in the common virtual collaboration surface for all collaborators to see.

The physical object capture zone 504 may also be thought of as a specialized portion of a virtual collaboration surface 512 (e.g., virtual collaboration surface 512-1 . . . 512-N). Any object captured in this region may not be part of the virtual collaboration surface 512, as the model may be a hologram and not a 3D point cloud. Although the physical object capture zone 504 is described with respect to the presenter, it should also be understood that each of the other collaborators may have their own physical object capture zone and/or all the collaborators at a site may share a common physical object capture zone.

Each of the non-presenting local collaborators (e.g., collaborators 516-2 . . . 516-N) may also participate in the collaboration session. They may do so by operating within their respective local collaboration zone 508 (e.g., collaboration zones 508-1 . . . 508-N), viewing a common virtual collaboration surface 512 via their respective XR device 518, and interacting with virtual collaboration surface 512 and/or any virtual objects displayed thereupon. The local collaborators can also place and/or reposition three-dimensional objects, two-dimensional objects, etc. that are shared locally and remotely on the virtual collaboration surface as virtual objects.

Each of the collaborators 516-1 . . . 516-N may have their own unique position relative to the virtual collaboration surface 512 where virtual objects are displayed. As a result, each of the collaborators 516 may have their own perspective of the virtual collaboration surface 512. In various embodiments, each of the collaborators 516 may be presented with a personalized view of the virtual collaboration surface 512. For instance, the presenting collaborator (e.g., collaborator 516-1) may be presented with a first view of the virtual collaboration surface 512 where any virtual objects, text, etc. displayed on the virtual collaboration surface 512 are oriented in their direction. Simultaneously, a second collaborator (e.g., collaborator 516-N) seated to the right of the present collaborator may be presented the same virtual collaboration surface 512 but with an appearance personalized to their position such that any virtual objects, notes, text, markings, etc. displayed on the virtual collaboration surface 512 are rotated to be oriented in their direction.

Virtual collaboration surface 512 may be utilized as the canvas for the virtual collaboration session. Virtual collaboration surface 512 may be snapped to a physical or a virtual surface. For instance, virtual collaboration surface 512 (e.g., virtual collaboration surface 512-1) may be horizontally oriented in a virtual tablecloth orientation snapped to a physical or virtual table. In some examples, a virtual collaboration surface 512 (e.g., virtual collaboration surface 512-N) may be vertically oriented in a virtual whiteboard orientation snapped to a physical or a virtual wall.

Collaborators 516 may place and/or reposition virtual three-dimensional objects, write virtual two-dimensional notes, etc. on and/or within the virtual collaboration surface 512. A placed virtual object (three-dimensional or two-dimensional) can be manipulated on the surface of the virtual collaboration surface 512 in XR. Additionally, even if the object is placed on the virtual collaboration surface 512 it may be manipulated in any design tool (e.g., computer aided design program, modeling program, etc.).

For example, a virtual model of an object may be created in computer-aided design and drafting software application. The model may be placed, displayed, viewed, repositioned, etc. on the virtual collaboration surface 512. A collaborator 516 may perform adjustments to the model via XR interactions with the virtual model while it is displayed on the virtual collaboration surface 512. However, the collaboration 516 may occasionally need to perform more fine-grained adjustments to the virtual model than can be achieved via XR interactions with the virtual model while it is displayed on the virtual collaboration surface 512. In such examples, the collaborator 516 may return to the instantiation of the virtual object modeled in the computer-aided design and drafting software application and adjust the model in the computer-aided design and drafting software application. The adjustment to the model made in the computer-aided design and drafting software application may be automatically populated through to the virtual model of the object displayed on the virtual collaboration surface 512.

As previously mentioned, in some examples, physical objects may be captured in a physical object capture zone 504. These objects may be reproduced on the virtual collaboration surface 512 as a hologram and not as a three-dimensional point cloud. However, deployment 500 may be configured so that snapshots of the object can be taken and placed on the virtual collaboration surface 512 as virtual objects.

In addition, a particular collaborator and/or team of collaborators participating in the collaboration session may be displayed and/or have access to more than one virtual collaboration surface during the collaboration session. For instance, a particular collaborator or team of collaborators may be displayed and/or use a first virtual collaboration surface (e.g., virtual collaboration surface 512-1) that is a shared collaboration surface. The shared virtual collaboration surface may be the virtual collaboration surface that is shared with, displayed to, accessed by, manipulated by, etc.

other collaborators such as remotely located collaborators. The particular collaborator or team of collaborators may also be displayed and/or use a second virtual collaboration surface (e.g., virtual collaboration surface 512-N). The second virtual collaboration surface may be a virtual collaboration that is displayed to, accessed by, manipulated by, etc. only the particular collaborator and/or only to other collaborators that are located in the same physical environment, are assigned to the same team, etc. as the particular collaborator. In some instances, virtual objects, snapshots of virtual objects, etc. may be moved between the more than one virtual collaboration surfaces during the collaboration session.

The virtual collaboration surface 512 may be adjusted between orientations. For example, the virtual collaboration surface 512 may be placed by collaborators 516 anywhere in an environment where an XR collaborations session is being conducted. In various embodiments, a collaborator 516 may adjust an orientation of a virtual collaboration surface 512 by making a gesture that engages a virtual collaboration surface 512 for reorientation. For instance, a collaborator 516 may pinch at a table to which a virtual collaboration surface 512-1 is snapped as though the collaborator 516 is picking up a real physical tablecloth from the table and holding it up. The collaborator 516 may then release their virtual grip on the virtual collaboration surface 512 when they have repositioned it where they want.

Likewise, collaborator 516 can pick up a virtual collaboration surface 512-N that is vertically oriented and snapped to a wall. Then, the collaborator 516 may place the virtual collaborator surface 512 on to a table. This transition may result in a reorientation of the virtual collaboration surface 512 from a vertical whiteboard orientation to a horizontal tablecloth orientation.

If there is already a virtual collaboration surface 512 with content on the table, then the two cloths may switch places. As such, there may be no need to clear the table of virtual objects and/or a virtual collaboration surface 512 to introduce another. All virtual objects placed on the virtual collaboration surface 512 may autorotate and/or reorient based on the orientation of the virtual collaboration surface 512. In addition, the virtual properties of the virtual objects displayed on the virtual collaboration surface 512 may be automatically adjusted based on the orientation of the virtual collaboration surface 512.

Figure 6:
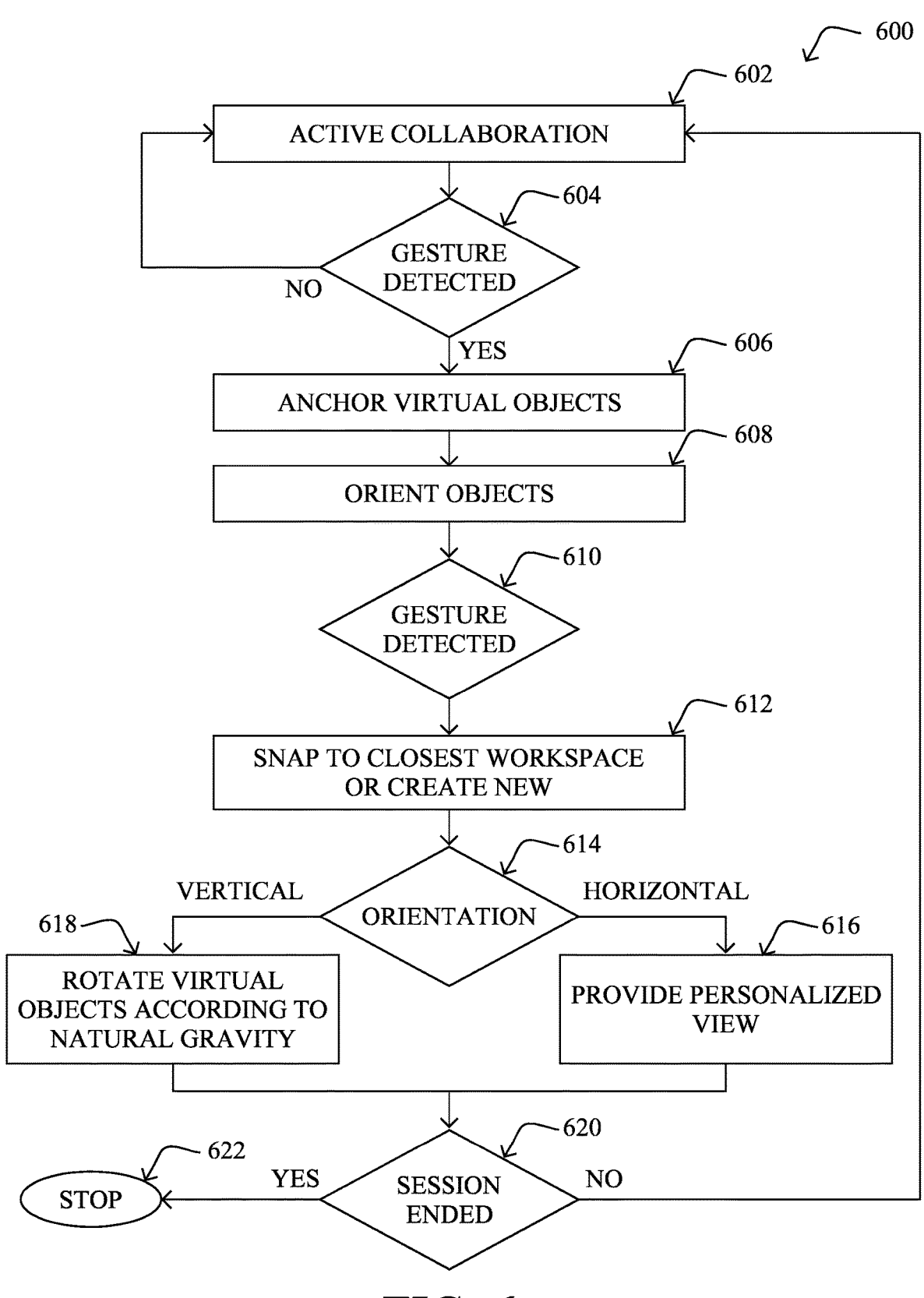
FIG. 6 illustrates an example of a flow involving modifying virtual properties of virtual objects.

FIG. 6 illustrates an example of a flow 600 involving modifying virtual properties of virtual objects according to various embodiments. At block 602, flow 600 may include an active collaboration session. An active collaboration session may include a virtual meeting which can be locally and/or remotely attended by collaborators via XR devices.

The active collaboration session may be conducted using a virtual collaboration surface displayed to each of the collaborators. The virtual collaboration surface may include the virtual zone where the collaboration session is hosted. The collaborators may place virtual objects, manipulate virtual objects, write, annotate, etc. on the virtual collaboration surface.

These objects may appear to be located on the virtual collaboration surface. However, the objects may not necessarily be initially anchored to the virtual collaboration surface. For example, the virtual collaboration surface may appear as a substantially horizontal surface with virtual objects freely placed and/or manipulatable thereupon. However, these objects may not be fixed or anchored to the virtual collaboration surface. The object may instead be freely moved independent of the virtual collaboration surface.

Conversely, the virtual collaboration surface may appear as a substantially vertical surface with virtual objects stuck thereupon. However, these objects may not be permanently fixed or anchored to the virtual collaboration surface, but may be picked off the virtual collaboration surface, repositioned, and stuck back to the virtual collaboration surface.

At block 604, flow 600 may include a gesture detection process. The gesture detection process may include detecting gestures made by collaborators as inputs to an XR collaboration application. When no gestures are detected and/or a gesture cannot be recognized (e.g., "NO"), then the active collaboration session may proceed without modification.

Alternatively, a gesture may be detected by the gesture detection process (e.g., "YES"). For example, a double pinch gesture performed by a collaborator to the virtual collaboration surface may be detected and/or recognized by the gesture detection process. A collaborator pinching with both hands at the virtual collaboration surface to pick it up as though it is a physical tablecloth may be recognized as the double pinch gesture.

At block 606, flow 600 may include anchoring virtual objects to the virtual collaboration surface. The virtual objects may be anchored in a natural way to the virtual collaboration surface. For instance, the virtual properties of the virtual object may be modified so that they objects do not fall of the virtual collaboration surface as it is moved. Instead, the virtual objects may have their virtual properties modified such that they appear to be stuck to the virtual collaboration surface. For instance, the virtual properties of the virtual objects may be modified such that they seem to the collaborator to be suddenly stuck to the virtual collaboration surface via a hook and loop mechanism.

At block 608, flow 600 may include orienting the virtual objects on the virtual collaboration surface in a natural way. Orienting the virtual objects in a natural way may include causing the virtual objects to assume an orientation that reflects and tracks with a natural orientation that would be expected of the virtual object if it was a physical object attached to a physical surface being moved and subjected to physical forces. This may include altering a perspective of the virtual object displayed to a collaborator so that it mimics a perspective shift that would occur in the real physical world if the virtual object and virtual collaboration surface were real physical world objects. For instance, if the top of a virtual object faces upward when the virtual collaboration surface is horizontal, then the objects may be oriented such that a side surface faces upward when the virtual collaboration surface is in a vertical orientation.

At block 610, flow 600 may again involve the gesture detection process. Specifically, the gesture detection process may be used to detect a gesture indicative of releasing the virtual collaboration surface from a collaborator's grip in its current orientation. For instance, the gesture detection process may detect a double pinch release gesture where the collaborator has discontinued the double pinch gesture used to manipulate the virtual orientation surface. Discontinuing this gesture may be interpreted as a signal that the collaborator wants to discontinue moving the virtual collaboration surface and leave it proximate to where it is currently located and/or in a same orientation that it is currently oriented in.

At block 612, the flow 600 may include responding to the release gesture by snapping the virtual collaboration surface to any physical objects such as tables, walls, etc. in the environment of the collaborator. Alternatively, the virtual collaboration surface may be snapped to virtual objects located in the XR environment of the collaborator. The object that the virtual collaboration surface is snapped to may be selected based on the location/proximity of the collaborator's hands relative to an object when a release gesture is detected. In some instances, if a physical or virtual object or surface does not exist or is not within a threshold distance of where the collaborator had the virtual collaboration surface positioned when the release gesture was detected, then the virtual collaboration surface may be left floating in its current orientation.

At block 614, the flow 600 may include determining an orientation of the virtual collaboration surface. Determining the orientation may include determining whether the virtual collaboration surface is oriented vertically or horizontally. The virtual properties and/or the orientation of the virtual objects displayed on the virtual collaboration surface according to the determined orientation of the virtual collaboration surface.

For example, if the virtual collaboration surface is in a horizontal orientation, then the virtual objects may be oriented as though they are sitting on a tabletop and their properties may be configured so that they are moveable within the virtual collaboration surface in a manner that mimics the movement of physical objects on a tabletop.

It should be appreciated that a collaborator may achieve their desired orientation through manipulations of the virtual collaboration surface. For instance, when a collaborator pinches two edges along a side of a virtual collaboration surface in a horizontal orientation and virtually picks up the virtual collaboration surface, the virtual collaboration surface may behave as a virtual tablecloth. This may mean that the non-pinched sides of the virtual collaboration surface behave as though they are subject to gravity. Therefore, the lifting of the edge of the virtual collaboration surface may translate to an ever-increasing title angle of the virtual collaboration surface relative to the surface as the pinched part rises and the un-pinched part stays fixed with respect to a surface that it is being picked up from.

Conversely, when a collaborator pinches two edges along a side of a virtual collaboration surface in a vertical orientation and virtually picks up the virtual collaboration surface, the virtual collaboration surface may behave as a virtual whiteboard. Therefore, the lifting of the pinched edge of the virtual collaboration surface may translate to a lifting of the un-pinched part as well. Then, when a collaborator places the un-pinched edge proximate to physical or virtual surface then it may make virtual contact and the lowering of the pinched edge relative to the surface may translate to an ever-decreasing angle of the virtual collaboration surface to the surface as the pinched part is lowered to the surface and the un-pinched part stays fixed with respect to the surface that is it being place upon.

Further, at block 616, the flow 600 may include providing each collaborator with a personalized view of the virtual objects oriented on the horizontal surface. For instance, each collaborator may receive a view of the same virtual objects, however their view may be personalized (e.g., a personalized visual perspective) to their orientation about the virtual collaboration surface. In some instances, this may include each collaborator individually receiving a personalized image of a virtual object where the object and/or text on the object is rotated so that it is in an appropriate reading orientation for that collaborator.

When the virtual collaboration surface is in a vertical orientation, the virtual objects may, at block 618, be rotated according to natural gravity. For example, the virtual objects may be oriented as though they are hanging on a vertically mounted whiteboard. The virtual objects may still be displayed as three-dimensional virtual objects on the surface of the vertically oriented virtual collaboration surface, but they may be oriented and/or have other virtual properties modified such that they appear and behave as though they are subject to real physical world forces, such as gravity.

At block 620, flow 600 may include determining whether the virtual collaboration session has ended. If the virtual session has not ended (e.g., "NO") then the virtual collaboration session may remain active and the flow 600 may continue to iterate as illustrated. Conversely, if the virtual session is determined to have ended (e.g., "YES"), then the flow 600 may progress to block 622 where the collaboration session is terminated.

Figure 7:
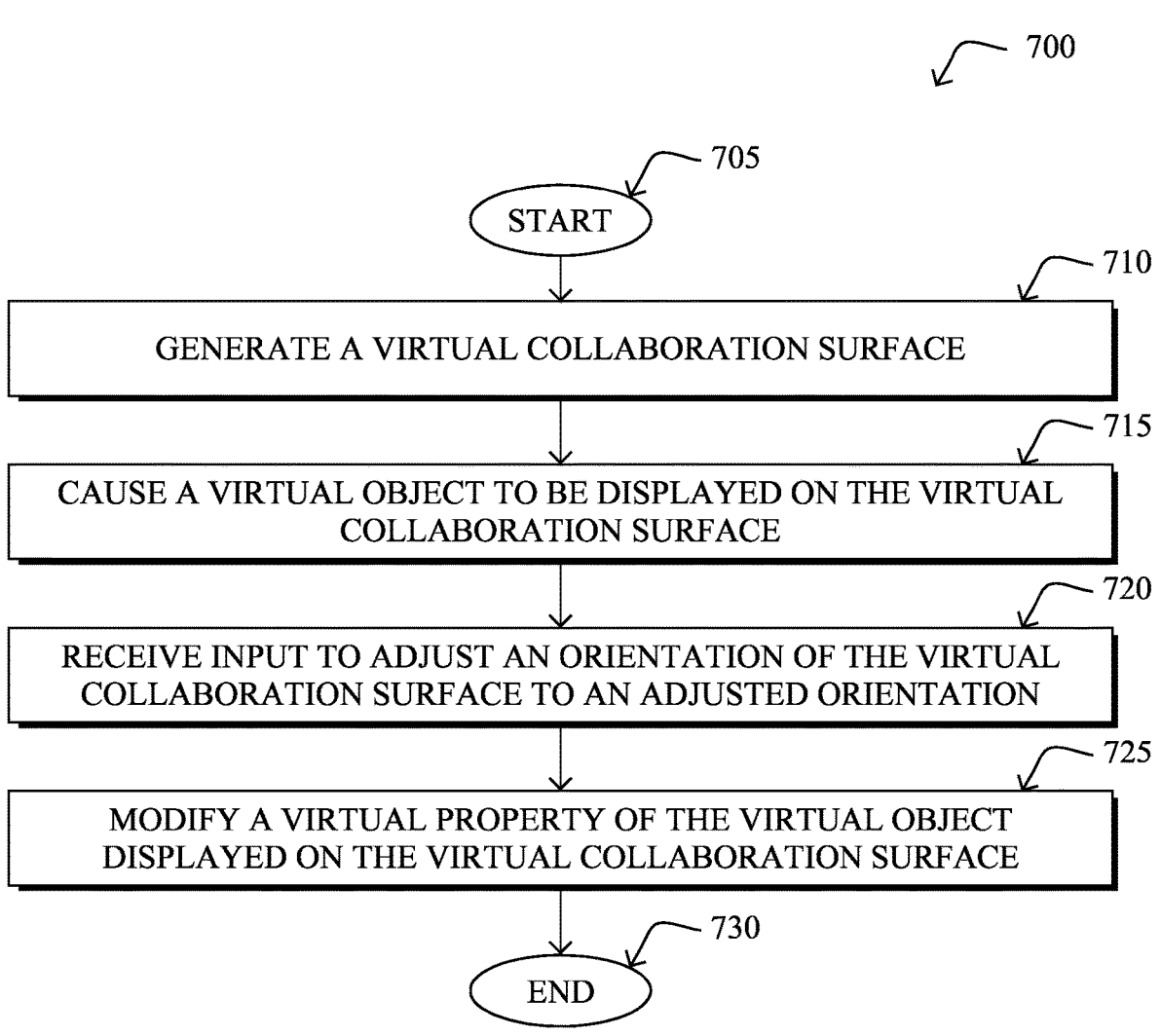
FIG. 7 illustrates an example simplified procedure for modifying virtual properties of virtual objects.

FIG. 7 illustrates an example simplified procedure (e.g., a method) for modifying virtual properties of virtual objects, in accordance with one or more embodiments described herein. For example, a non-generic, specifically configured device (e.g., device 200), may perform procedure 700 by executing stored instructions (e.g., virtual environment process 248).

The procedure 700 may start at step 705, and continues to step 710, where, as described in greater detail above, a device may generate a virtual collaboration surface to display to one or more collaborators. In various embodiments, generating the virtual collaboration surface may include conforming the virtual collaboration surface to a physical or virtual surface present in an environment of the one or more collaborators. The virtual collaboration surface may be configured to behave as a virtual tablecloth hosting contents of a collaboration session when in a horizontal orientation. Further, the virtual collaboration surface may be configured to behave as a virtual whiteboard hosting the contents of the collaboration session with the virtual object virtually fastened to its surface when in a non-horizontal orientation.

At step 715, as detailed above, a device may cause a virtual object to be displayed on the virtual collaboration surface. The virtual object may be a virtualization of a three-dimensional physical object placed in a physical object capture zone at a collaboration site of a presenting collaborator. The virtual object may appear as though it is separate from and/or able to be manipulated separate from the virtual collaboration surface.

At step 720, as detailed above, a device may receive input from one or more collaborators to adjust an orientation of the virtual collaboration surface to an adjusted orientation. For instance, the orientation of the virtual collaboration surface may be a horizontal orientation and the adjusted orientation may be a non-horizontal orientation and vice versa. The virtual collaboration surface may be conformed (e.g., in its adjusted orientation), responsive to the input from the one or more collaborators, to a physical surface present in the environment of the one or more collaborators.

At step 725, where, as detailed above, a device may modify a virtual property of the virtual object displayed on the virtual collaboration surface to reorient the virtual object according to the adjusted orientation of the virtual collaboration surface. Modifying the virtual property of the virtual object may include modifying a virtual attachment between the virtual object and the virtual collaboration surface to adapt to the adjusted orientation of the virtual collaboration surface For instance, the virtual attachment may be modified from a virtual gravity-based attachment between the virtual object and a horizontally oriented virtual collaboration surface to a virtual fastener-based attachment between the virtual object and a non-horizontally oriented virtual collaboration surface. For example, modifying the virtual attachment may include causing the virtual object to become removably anchored to a portion of the virtual collaboration surface when the adjusted orientation of the virtual collaboration surface is non-horizontal.

Modifying the virtual property of the virtual object may also include modifying an orientation of the virtual object displayed on the virtual collaboration surface to adapt to the adjusted orientation of the virtual collaboration surface. Such a modification may include altering which side of a virtual object faces a collaborator, altering an orientation of text toward a collaborator, etc.

In various embodiments, each of the one or more collaborators may be displayed a personalized orientation of the virtual object during a collaboration session. The virtual property of the virtual object may be dependent upon the personalized orientation of the virtual object. For example, the virtual object may display a first type of virtual property when the virtual object is displayed on a virtual collaboration surface having a horizontal orientation and the same virtual object may display a second type of virtual property when the virtual object is displayed on a virtual collaboration surface having a vertical orientation.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, may be utilized to provide immersive and engaging XR collaboration sessions that blur the lines between reality and virtual reality. By providing collaborators with an experience that mimics reality, more collaborative experiences are facilitated. Moreover, the techniques may be utilized to provide this level of immersion with conveniences not yet known to the XR collaborative session space. For example, the techniques allow for transitions between vertical and horizontal virtual collaboration surfaces that allow collaborators to engage in collaboration in the orientation that best suites them. By modifying the virtual properties of virtual objects displayed on a virtual collaboration surface in response to changes in orientation, the orientation and behavior of the virtual objects may be adapted to the orientation of the virtual collaboration surface for a natural and real feeling collaboration experience.

While there have been shown and described illustrative embodiments that provide modifying virtual properties of virtual objects, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/

RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    generating, by a device, a virtual collaboration surface to display to one or more collaborators, wherein the virtual collaboration surface behaves as a virtual tablecloth hosting contents of a collaboration session when in a horizontal orientation and as a virtual whiteboard hosting the contents of the collaboration session when in a non-horizontal orientation;
    causing, by the device, a virtual object to be displayed on the virtual collaboration surface, the virtual object being displayed based at least in part on a first virtual property of the virtual object, wherein the first virtual property corresponds to a gravity-based attachment between the virtual object and the virtual collaboration surface;
    receiving, by the device, input from one or more collaborators to adjust a first orientation of the virtual collaboration surface to a second orientation that is different than the first orientation;
    modifying, by the device and responsive to the first orientation being adjusted to the second orientation, the virtual object displayed on the virtual collaboration surface to cause a reorientation of the virtual object, wherein the reorientation of the virtual object represents a gravitational effect on the virtual object at the second orientation; and
    modifying, by the device and subsequent to the reorientation of the virtual object that represents the gravitational effect, the first virtual property of the virtual object to a second virtual property, wherein the second virtual property corresponds to a fastener-based attachment between the virtual object and the virtual collaboration surface instead of the gravity-based attachment.

2. The method as in claim 1, further comprising:
    conforming, by the device and responsive to the input, the virtual collaboration surface to a physical surface present in an environment of the one or more collaborators.

3. The method as in claim 1, wherein the first orientation of the virtual collaboration surface is a horizontal orientation and the second orientation is a non-horizontal orientation.

4. The method as in claim 1, wherein modifying the first virtual property of the virtual object to the second virtual property includes modifying an orientation of the virtual object displayed on the virtual collaboration surface to adapt to the second orientation of the virtual collaboration surface.

5. The method as in claim 1, wherein each of the one or more collaborators is displayed a personalized orientation of the virtual object during a collaboration session.

6. The method as in claim 5, wherein the first virtual property of the virtual object is dependent on the personalized orientation of the virtual object.

7. The method as in claim 1, wherein the virtual object is a virtualization of a three-dimensional physical object placed in a physical object capture zone at a collaboration site of a presenting collaborator.

8. The method as in claim 1, wherein the virtual object is virtually fastened to its surface in the non-horizontal orientation.

9. The method as in claim 1, wherein receiving the input to adjust the first orientation of the virtual collaboration surface to the second orientation comprises:

receiving a first input associated with a first side of the virtual collaboration surface, wherein a second side of the virtual collaboration surface corresponds to the gravitational effect instead of the first input.

10. The method as in claim 9, wherein the input is a first input, the method further comprising:

receiving, at the device and subsequent to the first orientation being adjusted to the second orientation, second input from the one or more collaborators and associated with the first side, wherein the second side corresponds to the second input instead of the gravitational effect.

11. An apparatus, comprising:

one or more network interfaces;

a processor coupled to the one or more network interfaces and configured to execute one or more processes; and a memory configured to store a process that is executable by the processor, the process when executed configured to:

generate, a virtual collaboration surface to display to one or more collaborators, wherein the virtual collaboration surface behaves as a virtual tablecloth hosting contents of a collaboration session when in a horizontal orientation and as a virtual whiteboard hosting the contents of the collaboration session when in a non-horizontal orientation;

cause a virtual object to be displayed on the virtual collaboration surface, the virtual object being displayed based at least in part on a first virtual property of the virtual object, wherein the first virtual property corresponds to a gravity-based attachment between the virtual object and the virtual collaboration surface;

receive input from one or more collaborators to adjust a first orientation of the virtual collaboration surface to a second orientation that is different than the first orientation;

modify, responsive to the first orientation being adjusted to the second orientation, the virtual object displayed on the virtual collaboration surface to cause a reorientation of the virtual object, wherein the reorientation of the virtual object represents a gravitational effect on the virtual object at the second orientation; and modifying, subsequent to the reorientation of the virtual object that represents the gravitational effect, the first virtual property of the virtual object to a second virtual property, wherein the second virtual property corresponds to a fastener-based attachment between the virtual object and the virtual collaboration surface instead of the gravity-based attachment.

12. The apparatus as in claim 11, further comprising:

conforming the virtual collaboration surface to a physical surface present in an environment of the one or more collaborators.

13. The apparatus as in claim 11, wherein the first orientation of the virtual collaboration surface is a horizontal orientation and the second orientation is a non-horizontal orientation.

14. The apparatus as in claim 11, wherein modifying the first virtual property of the virtual object to the second virtual property includes modifying an orientation of the virtual object displayed on the virtual collaboration surface to adapt to the second orientation of the virtual collaboration surface.

15. The apparatus as in claim 11, wherein each of the one or more collaborators is displayed a personalized orientation of the virtual object during a collaboration session.

16. The apparatus as in claim 15, wherein the first virtual property of the virtual object is dependent on the personalized orientation of the virtual object.

17. The apparatus as in claim 11, wherein the virtual object is a virtualization of a physical object placed on a physical surface where the virtual collaboration surface is displayed at a collaboration site of a presenting collaborator.

18. The apparatus as in claim 11, wherein receiving the input to adjust the first orientation of the virtual collaboration surface to the second orientation comprises:

receiving a first input associated with a first side of the virtual collaboration surface, wherein a second side of the virtual collaboration surface corresponds to the gravitational effect instead of the first input.

19. The apparatus as in claim 18, wherein the input is a first input the process when executed further comprising:

receiving, subsequent to the first orientation being adjusted to the second orientation, second input from the one or more collaborators and associated with the first side, wherein the second side corresponds to the second input instead of the gravitational effect.

20. A tangible, non-transitory, computer-readable medium storing program instructions that cause a device to execute a process comprising:

generating, by a device, a virtual collaboration surface to display to one or more collaborators, wherein the virtual collaboration surface behaves as a virtual tablecloth hosting contents of a collaboration session when in a horizontal orientation and as a virtual whiteboard hosting the contents of the collaboration session when in a non-horizontal orientation;

causing, by the device, a virtual object to be displayed on the virtual collaboration surface, the virtual object being displayed based at least in part on a first virtual property of the virtual object, wherein the first virtual property corresponds to a gravity-based attachment between the virtual object and the virtual collaboration surface;

receiving, by the device, input from one or more collaborators to adjust a first orientation of the virtual collaboration surface to a second orientation that is different than the first orientation;

modifying, by the device and responsive to the first orientation being adjusted to the second orientation, the virtual object displayed on the virtual collaboration surface to cause a reorientation of the virtual object, wherein the reorientation of the virtual object represents a gravitational effect on the virtual object at the second orientation; and modifying, by the device and subsequent to the reorientation of the virtual object that represents the gravitational effect, the first virtual property of the virtual object to a second virtual property, wherein the second virtual property corresponds to a fastener-based attachment between the virtual object and the virtual collaboration surface instead of the gravity-based attachment.

* * * * *